US010632517B2

(12) United States Patent
Teramoto et al.

(10) Patent No.: US 10,632,517 B2
(45) Date of Patent: Apr. 28, 2020

(54) CRIMP STRUCTURE, CRIMPING METHOD, AND ELECTRONIC DEVICE

(71) Applicant: OMRON Corporation, Kyoto-shi, Kyoto (JP)

(72) Inventors: Eiji Teramoto, Kyotanabe (JP); Tomoyuki Hakata, Uji (JP); Hitoshi Nakano, Kouka (JP); Kazuyoshi Nishikawa, Ritto (JP)

(73) Assignee: OMRON Corporation, Kyoto-shi (JP)

( * ) Notice: Subject to any disclaimer, the term of this patent is extended or adjusted under 35 U.S.C. 154(b) by 897 days.

(21) Appl. No.: 15/120,143

(22) PCT Filed: Feb. 16, 2015

(86) PCT No.: PCT/JP2015/054077
§ 371 (c)(1),
(2) Date: Aug. 19, 2016

(87) PCT Pub. No.: WO2015/137044
PCT Pub. Date: Sep. 17, 2015

(65) Prior Publication Data
US 2017/0120321 A1 May 4, 2017

(30) Foreign Application Priority Data
Mar. 14, 2014 (JP) ................. 2014-052417

(51) Int. Cl.
B21D 39/04 (2006.01)
F16B 17/00 (2006.01)
F16B 11/00 (2006.01)

(52) U.S. Cl.
CPC ......... B21D 39/048 (2013.01); B21D 39/046 (2013.01); F16B 11/002 (2013.01); F16B 17/004 (2013.01)

(58) Field of Classification Search
CPC ..... H01R 13/405; H01R 13/415; F16B 17/00; F16B 17/004; F16B 11/002;
(Continued)

(56) References Cited

U.S. PATENT DOCUMENTS 3,534,583 A * 10/1970 Demler, Sr. ............ B21D 39/04
72/409.08
4,523,872 A * 6/1985 Arena .................... B21D 26/14
29/419.2

(Continued)

FOREIGN PATENT DOCUMENTS

DE 102004020065 B3 * 9/2005 ........... B21D 39/046
DE 102011080266 A1 2/2012
(Continued)

OTHER PUBLICATIONS

Extended European Search Report (EESR) dated Sep. 27, 2017 in a counterpart European patent application.

Primary Examiner — Jonathan P Masinick
(74) Attorney, Agent, or Firm — Metrolex IP Law Group, PLLC

(57) ABSTRACT

Provided is a crimp structure in which an inner member and an outer member that is arranged outside the inner member are joined to each other. The inner member includes: an insertion portion having a columnar surface-like outer circumferential surface; and a recessed portion provided in the outer circumferential surface. The outer member includes: a cylindrical portion that forms an opening into which the insertion portion is inserted; a reduced-diameter portion that is formed in the cylindrical portion, and has a plastically deformed shape such that a diameter of the cylindrical portion is reduced annularly inward in a radial direction; and a protruding portion that has a plastically deformed shape such that a part, in a circumferential direction, of the
(Continued)

reduced-diameter portion has entered the recessed portion. Relative rotation of the inner member and the outer member can be suppressed.

11 Claims, 12 Drawing Sheets

(58) Field of Classification Search
CPC ...... B21D 39/048; B21D 39/04; B21D 41/04; F16L 13/14; F16L 13/141
See application file for complete search history.

(56) References Cited

U.S. PATENT DOCUMENTS

| | | | |
|---|---|---|---|
| 7,516,990 B2* | 4/2009 | Jamison | B25B 27/10 |
| | | | 285/256 |
| 8,567,821 B1* | 10/2013 | Wagner | B62D 27/023 |
| | | | 280/781 |
| 8,876,425 B2* | 11/2014 | Wilson | F16B 11/008 |
| | | | 285/286.2 |
| 9,500,304 B2* | 11/2016 | Golovashchenko | F16B 17/004 |
| 9,793,637 B2* | 10/2017 | Teramoto | B21D 39/048 |
| 2004/0095032 A1 | 5/2004 | Hase et al. | |
| 2007/0006634 A1* | 1/2007 | McCabe, Jr. | B21D 39/04 |
| | | | 72/402 |

FOREIGN PATENT DOCUMENTS

| | | |
|---|---|---|
| JP | S55-088939 A | 7/1980 |
| JP | H05-317992 A | 12/1993 |
| JP | 2004-072924 A | 3/2004 |

* cited by examiner

FIG.18

|  |  | Example A1 | Example A2 | Example A3 | Example A4 | Example A5 | Example A6 |
|---|---|---|---|---|---|---|---|
| Metal cover (cylindrical portion) | Thickness [mm] | 0.10 | 0.20 | 0.40 | 0.70 | 1.00 | 1.20 |
| Connector | Groove width [mm] | 0.20 | 0.40 | 0.80 | 1.40 | 2.00 | 2.40 |
|  | Groove depth [mm] | 0.25 | 0.25 | 0.25 | 0.25 | 0.25 | 0.25 |
| S roller | Front end R | 0.30 | 0.30 | 0.30 | 0.30 | 0.30 | 0.30 |
| Evaluation |  | D | B | A | A | B | D |

FIG.19

|  |  |  | Example B1 | Example B2 | Example B3 | Example B4 | Example B5 |
|---|---|---|---|---|---|---|---|
| Metal cover (cylindrical portion) | Thickness [mm] |  | 0.40 | 0.40 | 0.40 | 0.40 | 0.40 |
| Connector | Groove width | Metal cover thickness ratio | 1.0 | 1.5 | 2.5 | 3.5 | 4.0 |
|  |  | [mm] | 0.40 | 0.60 | 1.00 | 1.40 | 1.60 |
|  | Groove depth [mm] |  | 0.25 | 0.25 | 0.25 | 0.25 | 0.25 |
| S roller | Front end R |  | 0.30 | 0.30 | 0.30 | 0.30 | 0.30 |
| Evaluation |  |  | D | C | B | A | A |

FIG.20

|  |  | Example C1 | Example C2 | Example C3 | Example C4 | Example C5 |
|---|---|---|---|---|---|---|
| Metal cover (cylindrical portion) | Thickness [mm] | 0.40 | 0.40 | 0.40 | 0.40 | 0.40 |
| Connector | Groove width [mm] | 1.00 | 1.00 | 1.00 | 1.00 | 1.00 |
|  | Groove depth [mm] | 0.10 | 0.15 | 0.20 | 0.25 | 0.30 |
| S roller | Front end R | 0.30 | 0.30 | 0.30 | 0.30 | 0.30 |
|  | Evaluation | D | C | B | A | A |

FIG.21

| | | Example D1 | Example D2 | Example D3 | Example D4 | Example D5 |
|---|---|---|---|---|---|---|
| Metal cover (cylindrical portion) | Thickness [mm] | 0.40 | 0.40 | 0.40 | 0.40 | 0.40 |
| Connector | Groove width [mm] | 1.00 | 1.00 | 1.00 | 1.00 | 1.00 |
| | Groove depth [mm] | 0.25 | 0.25 | 0.25 | 0.25 | 0.25 |
| S roller | Front end R | 0.30 | 0.30 | 0.30 | 0.30 | 0.30 |
| Amount of reduction in diameter of metal cover (ratio with respect to initial inner diameter [%]) | | 1.5 | 1.5 | 1.5 | 1.5 | 1.5 |
| Entry amount of protruding portion [mm] | | 0.05 | 0.10 | 0.15 | 0.20 | 0.25 |
| Evaluation | | D | B | A | A | D |

FIG.22

| | | Example E1 | Example E2 | Example E3 | Example E4 |
|---|---|---|---|---|---|
| Metal cover (cylindrical portion) | Thickness [mm] | 0.40 | 0.40 | 0.40 | 0.40 |
| Connector | Groove width [mm] | 1.00 | 1.00 | 1.00 | 1.00 |
| | Groove depth [mm] | 0.20 | 0.20 | 0.20 | 0.20 |
| | Height of projection portion [mm] | 0.05 | 0.10 | 0.15 | 0.20 |
| | Width of projection portion [mm] | 1.00 | 1.00 | 1.00 | 1.00 |
| | Number of projection portion | 6 | 6 | 6 | 6 |
| S roller | Front end R | 0.30 | 0.30 | 0.30 | 0.30 |
| Evaluation | | D | A | A | C |

FIG.23

|  |  | Example F1 | Example F2 | Example F3 | Example F4 | Example F5 |
|---|---|---|---|---|---|---|
| Metal cover (cylindrical portion) | Thickness [mm] | 0.40 | 0.40 | 0.40 | 0.40 | 0.40 |
| Connector | Groove width [mm] | 1.00 | 1.00 | 1.00 | 1.00 | 1.00 |
| | Groove depth [mm] | 0.20 | 0.20 | 0.20 | 0.20 | 0.20 |
| | Height of projection portion [mm] | 0.15 | 0.15 | 0.15 | 0.15 | 0.15 |
| | Width of projection portion [mm] | 1.00 | 1.00 | 1.00 | 1.00 | 1.00 |
| | Number of projection portion | 1 | 2 | 4 | 8 | 10 |
| S roller | Front end R | 0.30 | 0.30 | 0.30 | 0.30 | 0.30 |
| Evaluation | | D | B | A | A | C |

CRIMP STRUCTURE, CRIMPING METHOD, AND ELECTRONIC DEVICE

TECHNICAL FIELD

The present invention relates to a crimp structure and a crimping method in which two members are joined to each other by crimping, and an electronic device that is provided with such a crimp structure.

RELATED ART

As disclosed in JP H05-317992A (Patent Document 1), a crimp structure in which two members are joined to each other by crimping is known. A case is considered in which an inner member having a columnar surface-like outer circumferential surface, and an outer member including a cylindrical portion are prepared, and the outer member is joined to the outer side of the inner member by crimping. After the joining, the inner member and the outer member may rotate relatively if no countermeasure is provided.

RELATED ART DOCUMENTS

Patent Documents

Patent Document 1: JP H05-317992A

SUMMARY OF THE INVENTION

Problem to be Solved by the Invention

It is an object of the present invention to provide a crimp structure and a crimping method that can prevent relative rotation of an inner member and an outer member, and an electronic device that is provided with such a crimp structure.

Means for Solving the Problems

According to the present invention, a crimp structure in which an inner member and an outer member that is arranged outside the inner member are joined to each other is such that the inner member includes: an insertion portion that has a columnar surface-like outer circumferential surface, and a recessed portion that is provided in the outer circumferential surface, the outer member includes: a cylindrical portion that forms an opening into which the insertion portion is inserted; a reduced-diameter portion that is formed on the cylindrical portion, and has a plastically deformed shape such that a diameter of the cylindrical portion is reduced annularly inward in a radial direction; and a protruding portion that has a plastically deformed shape such that a part, in a circumferential direction, of the reduced-diameter portion has entered the recessed portion.

Preferably, the inner member includes a plurality of the recessed portions, and the outer member includes a plurality of the protruding portions.

Preferably, the plurality of recessed portions are lined up at equal intervals in the circumferential direction.

Preferably, the plurality of recessed portions have the same shape.

Preferably, the outer member includes a recessed region that is fitted to a projecting portion formed between adjacent recessed portions of the inner member.

Preferably, the inner member further includes an annular groove provided in the outer circumferential surface, and the recessed portion is formed inside the annular groove.

According to the present invention, an electronic device includes the crimp structure according to the present invention.

According to the present invention, a crimping method of performing crimping to join an outer member to an inner member that is arranged inside the outer member, the method including: an inner-member preparation step of preparing the inner member that includes an insertion portion having a columnar surface-like outer circumferential surface, and a recessed portion provided in the outer circumferential surface; an outer-member preparation step of preparing the outer member that includes a cylindrical portion that forms an opening into which the insertion portion is to be inserted; an insertion step of inserting the insertion portion into the cylindrical portion; and a diameter-reducing step of reducing a diameter of the cylindrical portion with spinning, wherein, by reducing the diameter of the cylindrical portion, a reduced-diameter portion that has a plastically deformed shape such that a diameter of a part of the cylindrical portion is reduced annularly inward in a radial direction, and a protruding portion that has a plastically deformed shape such that a part, in a circumferential direction, of the reduced-diameter portion has entered the recessed portion are formed in the outer member.

Preferably, the inner member that is prepared in the inner-member preparation step includes a plurality of the recessed portions, and the outer member that is prepared in the outer-member preparation step includes a recessed region that is fitted to a projecting portion formed between adjacent recessed portions.

Preferably, the inner member that is prepared in the inner-member preparation step includes a plurality of the recessed portions, and by reducing a diameter of the cylindrical portion, a recessed region that is fitted to a projecting portion formed between adjacent recessed portions is formed in the cylindrical portion of the outer member.

Preferably, the inner member that is prepared in the inner-member preparation step is provided with an annular groove in the outer circumferential surface, and the recessed portion that is formed inside the annular groove.

Effects of the Invention

A part (protruding portion) of a reduced-diameter portion formed on an outer member enters a recessed portion formed in an inner member, and thus the protruding portion and the recessed portion are fitted to each other. Accordingly, it is possible to prevent relative rotation of the inner member and the outer member.

BRIEF DESCRIPTION OF THE DRAWINGS

FIG. 18 is a diagram illustrating experimental conditions and evaluations of Examples A1 to A6.

FIG. 19 is a diagram illustrating experimental conditions and evaluations of Examples B1 to B5.

FIG. 20 is a diagram illustrating experimental conditions and evaluations of Examples C1 to C5.

FIG. 21 is a diagram illustrating experimental conditions and evaluations of Examples D1 to D5.

FIG. 22 is a diagram illustrating experimental conditions and evaluations of Examples E1 to E4.

FIG. 23 is a diagram illustrating experimental conditions and evaluations of Examples F1 to F5.

EMBODIMENTS OF THE INVENTION

Figure 1:
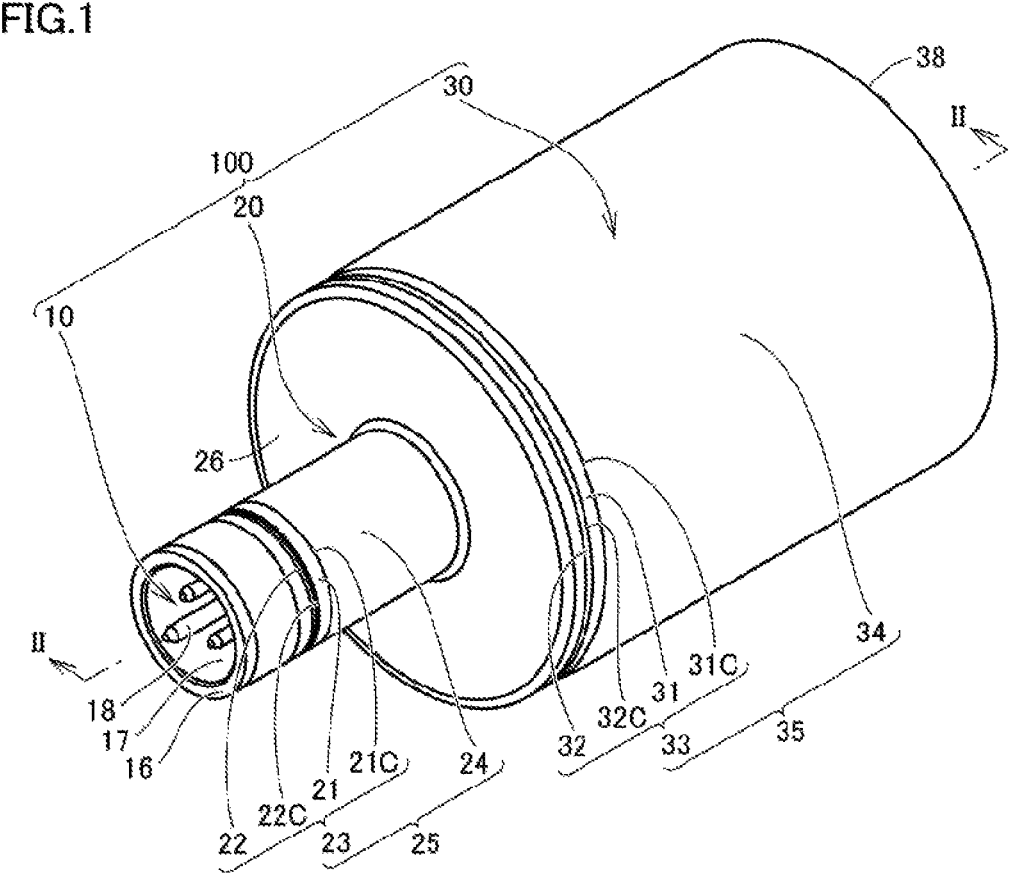
FIG. 1 is a perspective view illustrating an electronic device according to Embodiment 1.

Hereinafter, embodiments and examples according to the present invention will be described with reference to the drawings. When number, amount, and the like are mentioned, the scope of the present invention is not necessarily limited to the number, amount, and the like, unless specifically noted otherwise.

Like reference numerals are given to like components and corresponding components, and redundant descriptions may be omitted.

Embodiment 1

Figure 2:
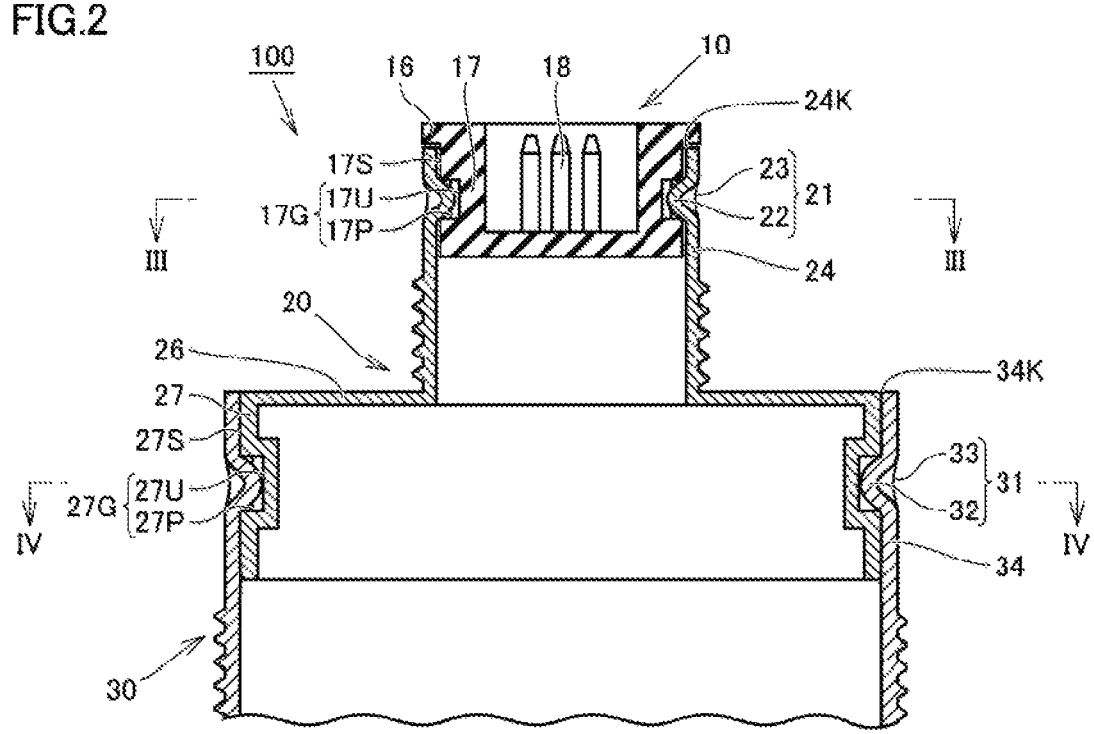
FIG. 2 is a cross-sectional view taken along a line II-II of FIG. 1.
Figure 3:
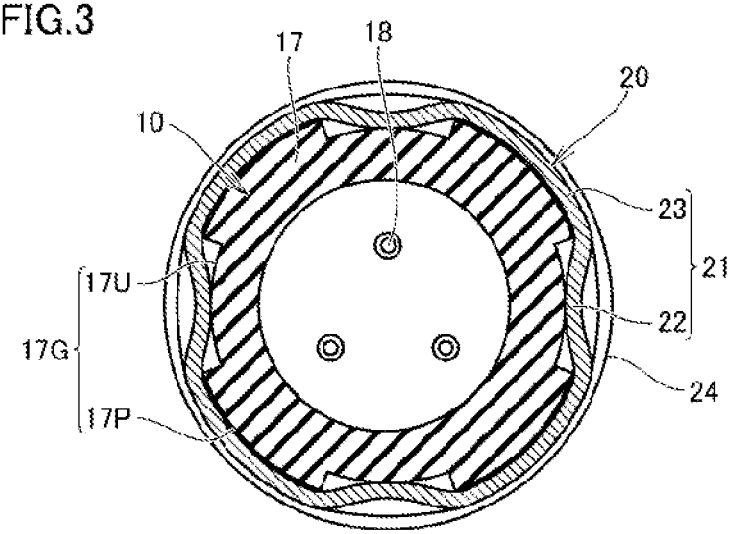
FIG. 3 is a cross-sectional view taken along a line III-III of FIG. 2.
Figure 4:
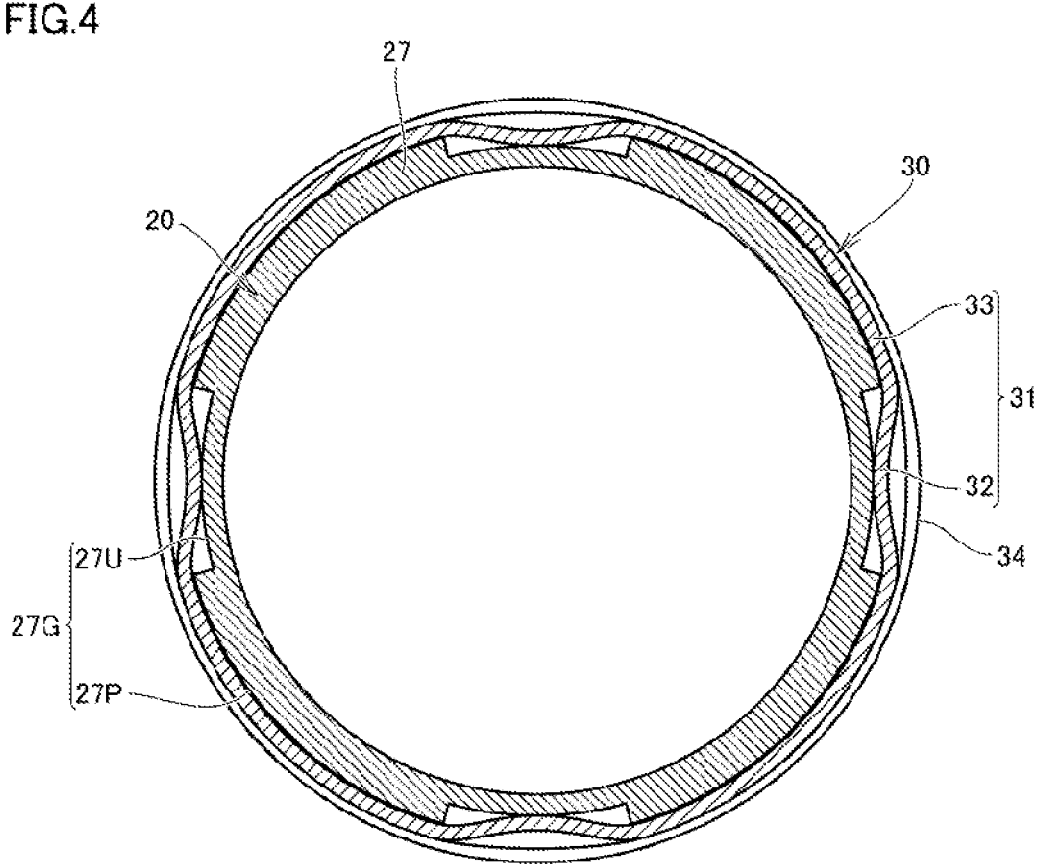
FIG. 4 is a cross-sectional view taken along a line IV-IV of FIG. 2.
Figure 5:
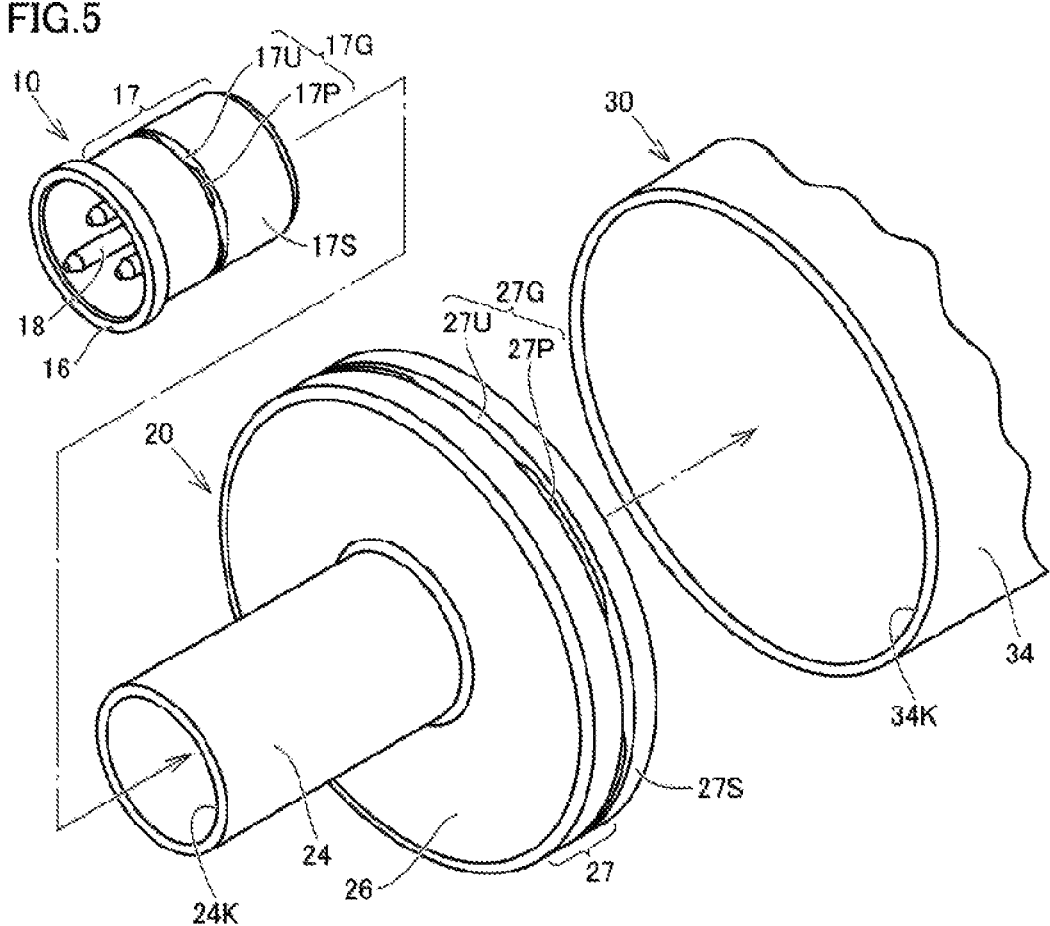
FIG. 5 is a perspective view illustrating a first step (preparation step) of a crimping method of Embodiment 1.

FIG. 1 is a perspective view illustrating an electronic device 100 according to Embodiment 1. FIG. 2 is a cross-sectional view taken along a line II-II of FIG. 1. FIG. 3 is a cross-sectional view taken along a line III-III of FIG. 2. FIG. 4 is a cross-sectional view taken along a line IV-IV of FIG. 2. In FIGS. 2 and 4, various electronic components that are arranged inside the electronic device 100 are not shown, for convenience of description. FIG. 5 is a perspective view illustrating a first step of a crimping method according to Embodiment 1. FIG. 5 shows the state before constituent components (a connector 10, a cover body 20, and a base fitting 30, which will be described later) of the electronic device 100 are subjected to crimping.

The electronic device 100 (FIGS. 1 and 2) of the present embodiment constitutes a nearby sensor as an example. The electronic device 100 generates a magnetic field from a front face 38 (FIG. 1) side, and detects whether or not a detection target is present and approaching. In the description below, the side on which the front face 38 is located may be referred to as "front side", and the side on which a connector 10 (FIG. 1) is located may be referred to as "rear side". In FIG. 2, the lower side of the drawing corresponds to "front side", and the upper side of the drawing corresponds to "rear side".

Electronic Device 100

As shown in FIGS. 1 to 4, the electronic device 100 is provided with the connector 10, the cover body 20, and the base fitting 30. The base fitting 30 has a hollow cylindrical shape, and includes various electronic components. The cover body 20 (see FIG. 5 also) is arranged inside the base fitting 30 on the rear end side thereof, and closes the opening (opening 34K of FIGS. 2 and 5) on the rear end side of the base fitting 30.

The base fitting 30 is joined to the cover body 20 by crimping a part of the base fitting 30 inwardly, but the detailed crimp structure and crimping method will be described later. In the relationship between the cover body 20 and the base fitting 30, the cover body 20 corresponds to an inner member, and the base fitting 30 corresponds to an outer member.

The cover body 20 has, on the rear side thereof, a cylindrical portion 24 that has a hollow cylindrical shape. The connector 10 (see also FIG. 5) is arranged inside the cylindrical portion 24, and closes the opening (opening 24K of FIGS. 2 and 5) on the rear end side of the cylindrical portion 24.

The cover body 20 is joined to the connector 10 by crimping a part of the cover body 20 (cylindrical portion 24) inwardly, but the detailed crimp structure and crimping method will be described later. In the relationship between the connector 10 and the cover body 20, the connector 10 corresponds to an inner member, and the cover body 20 corresponds to an outer member.

Connector 10

Referring mainly to FIGS. 1 and 2, the connector 10 is provided with an insertion portion 17 and terminal pins 18. The insertion portion 17 has a bottomed cylindrical shape, and is provided with a flange 16 on the rear end side thereof. The insertion portion 17 is made of resin, for example. The insertion portion 17 is a portion that is arranged inside the cylindrical portion 24 of the cover body 20, which will be described below. The insertion portion 17 includes a columnar surface-like outer circumferential surface 17S (FIGS. 2 and 5), and the outer circumferential surface 17S is provided with an annular groove 17G (FIGS. 2, 3, and 5).

The annular groove 17G has a shape such that a part of the outer circumferential surface 17S is recessed annularly inward in a radial direction. A plurality of recessed portions 17U (FIGS. 2, 5, and 10), and a plurality of projecting portions 17P (FIGS. 2, 5, and 10) are formed inside the annular groove 17G. Assuming that the distance from the outer circumferential surface 17S in the radial direction is defined as "groove depth", the plurality of recessed portions 17U are parts of the annular groove 17G that have the largest groove depth to the inside, and are lined up at equal intervals in a circumferential direction. In the present embodiment, the plurality of recessed portions 17U have the same shape. Each projecting portion 17P is formed between adjacent recessed portions 17U (see FIG. 10), and is located inside the annular groove 17G. The projection height, in the radial direction, of the projecting portions 17P is preferably at least a value obtained by "groove depth of the annular groove 17G—0.5", in view of preventing relative rotation of the connector 10 and the cover body 20.

The width of the annular groove 17G (recessed portions 17U) is preferably at least a value that is obtained by "thickness of the cylindrical portion 24×1.5", in view of making it easy for protruding portions 22 (described later) to enter the annular groove 17G. The depth of the annular groove 17G (recessed portions 17U) is preferably at least a value that is obtained by "thickness of the cylindrical portion 24×0.4", in view of ensuring a depth of entry of the protruding portions 22 (described later). The terminal pins 18 connect external devices and the electronic device 100, although a detailed configuration relating to the electrical connection is not shown.

Cover Body 20

The cover body 20 includes the cylindrical portion 24, a disk portion 26, and an insertion portion 27 (FIGS. 2 and 5), and is formed integrally of a metal member. The cylindrical portion 24 is provided on the rear side of the cover body 20, and has a hollow cylindrical shape. The thickness of the cylindrical portion 24 is preferably about 0.2 mm to 1.0 mm, in view of strength retention and ease of plastic deformation.

As shown in FIG. 2, the outer circumferential surface of the cylindrical portion 24 is provided with a male thread (not shown in FIGS. 1 and 5) as needed. The rear end (end on the upper side of FIG. 2) of the cylindrical portion 24 forms the opening 24K (FIGS. 2 and 5) into which the insertion portion 17 of the connector 10 is inserted. The cylindrical portion 24 is provided with a reduced-diameter portion 21.

The reduced-diameter portion 21 has a shape such that a part of the cylindrical portion 24 is recessed annularly inward in the radial direction. The reduced-diameter portion 21 is a portion that is formed by parts of a metal member constituting the cylindrical portion 24 being crimped inwardly at positions that correspond to the annular groove 17G (the recessed portions 17U and the projecting portions 17P), and being subjected to plastic deformation such that the diameter of the parts of this metal member is reduced annularly.

A plurality of protruding portions 22 (FIGS. 1 to 3) and a plurality of large-diameter portions 23 (FIGS. 1 to 3) are formed inside the reduced-diameter portion 21. The plurality of protruding portions 22 are located further inward in the radial direction than the plurality of large-diameter portions 23. The plurality of protruding portions 22 are parts that are located at the most inward position, in the radial direction, of the reduced-diameter portion 21, and are lined up at equal intervals in the circumferential direction.

The plurality of protruding portions 22 are portions that are formed by parts of the metal member constituting the cylindrical portion 24 being crimped inwardly at positions that correspond to the recessed portions 17U of the annular groove 17G, and being subjected to plastic deformation such that the parts of that metal member enter the recessed portions 17U. The plurality of protruding portions 22 have the same shape. A part (at least a part), inward in the radial direction, of each protruding portion 22 has entered the corresponding recessed portion 17U of the annular groove 17G.

The plurality of large-diameter portions 23 are portions that are formed by parts of the metal member constituting the crimped cylindrical portion 24 being crimped inwardly at positions that correspond to the projecting portions 17P of the annular groove 17G, and being subjected to plastic deformation conforming to the shape of the surfaces of the projecting portions 17P. The large-diameter portions 23 of the present embodiment correspond to "recessed regions". The large-diameter portions 23 are each formed between adjacent protruding portions 22 (see FIG. 3), and are also located inside the reduced-diameter portion 21.

In the present embodiment, with the above-described configuration of the annular groove 17G and the reduced-diameter portion 21, a crimp structure is realized between the connector 10 and the cover body 20, and the connector 10 and the cover body 20 are joined to each other. Positional shifting of the annular groove 17G and the reduced-diameter portion 21 in the circumferential direction is suppressed by the protruding portions 22 and the recessed portions 17U being fitted to each other. That is, relative rotation of the connector 10 and the cover body 20 is suppressed by the protruding portions 22 and the recessed portions 17U being fitted to each other.

The disk portion 26 is provided at the front end of the cylindrical portion 24. The insertion portion 27 is a portion that is arranged inside a cylindrical portion 34 of the base fitting 30, which will be described below. The insertion portion 27 has a shape that tubularly extends to the front from the peripheral edge of the disk portion 26. Specifically, the insertion portion 27 includes a columnar surface-like outer circumferential surface 27S (FIGS. 2 and 5), and the outer circumferential surface 27S is provided with an annular groove 27G (FIGS. 2, 4, and 5)

The annular groove 27G has a shape such that parts of the outer circumferential surface 27S are recessed inward in a radial direction. A plurality of recessed portions 27U (FIGS. 2, 5, and 7) and a plurality of projecting portions 27P (FIGS. 2, 5, and 7) are formed inside the annular groove 27G. Assuming that the distance in the radial direction from the outer circumferential surface 27S is set as "groove depth", the plurality of recessed portions 27U are parts that have the largest groove depth inside the annular groove 27G, and are lined up at equal intervals in the circumferential direction. In the present embodiment, the plurality of recessed portions 27U have the same shape. Each projecting portion 27P is formed between adjacent recessed portions 27U (see FIG. 7), and is located inside the annular groove 27G. The projection height, in the radial direction, of the projecting portions 27P is preferably at least a value that is obtained by "groove depth of the annular groove 27G×0.5", in view of preventing relative rotation of the cover body 20 and the base fitting 30.

The width of the annular groove 27G (recessed portions 27U) is preferably at least a value that is obtained by "thickness of the cylindrical portion 34×1.5", in view of making it easy for protruding portions 32 (described later) to enter the annular groove 27G. The depth of the annular groove 27G (recessed portions 27U) is preferably at least a value that is obtained by "thickness of the cylindrical portion 34×0.4", in view of ensuring a depth of entry of the protruding portions 32 (described later).

Base Fitting 30

The base fitting 30 includes the cylindrical portion 34 that has a hollow cylindrical shape, and the front face 38 (FIG. 1) thereof is closed by another resin member (not shown). The cylindrical portion 34 is made of a metal member, and accommodates a coil for detection, a printed board, and the like. The thickness of the cylindrical portion 34 is preferably about 0.2 mm to 1.0 mm, in view of strength retention and ease of plastic deformation.

As shown in FIG. 2, the outer circumferential surface of the cylindrical portion 34 is provided with a male thread (not shown in FIGS. 1 and 5) as needed. The rear end (end on the upper side of FIG. 2) of the cylindrical portion 34 forms the opening 34K (FIGS. 2 and 5) into which the insertion portion 27 of the cover body 20 is inserted. The cylindrical portion 34 is provided with a reduced-diameter portion 31.

The reduced-diameter portion 31 has a shape such that a part of the cylindrical portion 34 is recessed annularly inward in the radial direction. The reduced-diameter portion 31 is a portion that is formed by parts of the metal member constituting the cylindrical portion 34 being crimped inward at positions that correspond to the annular groove 27G (the recessed portion 27U and the projecting portion 27P), and being subjected to plastic deformation such that the diameter of the parts of the metal member is reduced annularly.

A plurality of protruding portions 32 (FIGS. 1, 2, and 4) and a plurality of large-diameter portions 33 (FIGS. 1, 2, and 4) are formed inside the reduced-diameter portion 31. The plurality of protruding portions 32 are located further inward in the radial direction than the plurality of large-diameter portions 33. The plurality of protruding portions 32 are parts located at positions that are the most inward in the radial direction of the reduced-diameter portion 31, and are lined up at equal intervals in the circumferential direction.

The plurality of protruding portions 32 are portions that are formed by parts of the metal member constituting the cylindrical portion 34 being respectively crimped inward at positions that correspond to the recessed portions 27U of the annular groove 27G, and being subjected to plastic deformation so as to enter the respective recessed portions 27U. The plurality of protruding portions 32 have the same shape. A part (at least a part), inward in the radial direction, of each protruding portion 32 has entered the corresponding recessed portion 27U of the annular groove 27G.

The plurality of large-diameter portions 33 are portions that are formed by parts of the metal member constituting the cylindrical portion 34 being crimped inward at positions that correspond to the projecting portions 27P of the annular groove 27G, and being subjected to plastic deformation conforming to the shape of the surfaces of the projecting portions 27P. The large-diameter portions 33 of the present embodiment correspond to "recessed regions". The large-diameter portion 33 are each formed between adjacent protruding portions 32 (see FIG. 4), and are also located inside the reduced-diameter portion 31.

In the present embodiment, with the above-described configuration of the annular groove 27G and the first reduced-diameter portion 31, a crimp structure is realized between the cover body 20 and the base fitting 30, and the cover body 20 and the base fitting 30 are joined to each other. Positional shifting of the annular groove 27G and the reduced-diameter portion 31 in the circumferential direction is suppressed by the protruding portions 32 and the recessed portions 27U being fitted to each other. That is, relative rotation of the cover body 20 and the base fitting 30 is suppressed by the protruding portions 32 and the recessed portions 27U being fitted to each other.

Crimping Method
Preparation Step

The crimping method according to the present embodiment will be described with reference to FIGS. 5 to 11. As shown in FIG. 5, first, the connector 10, the cover body 20, and the base fitting 30 are prepared. The connector 10, the cover body 20, and the base fitting 30 of FIG. 5 are shown in a state prior to these members being subjected to crimping.

The connector 10 includes: the insertion portion 17 that has the columnar surface-like outer circumferential surface 17S; the annular groove 17G provided in the outer circumferential surface 17S; the flange 16; and the terminal pins 18. A plurality of recessed portions 17U and a plurality of projecting portions 17P are formed inside the annular groove 17G. The cover body 20 includes: the cylindrical portion 24 having the opening 24K; the disk portion 26; the insertion portion 27 having the columnar surface-like outer circumferential surface 27S; and the annular groove 27G provided in the outer circumferential surface 27S. A plurality of recessed portions 27U and a plurality of projecting portions 27P are formed inside the annular groove 27G.

Insertion Step

Figure 6:
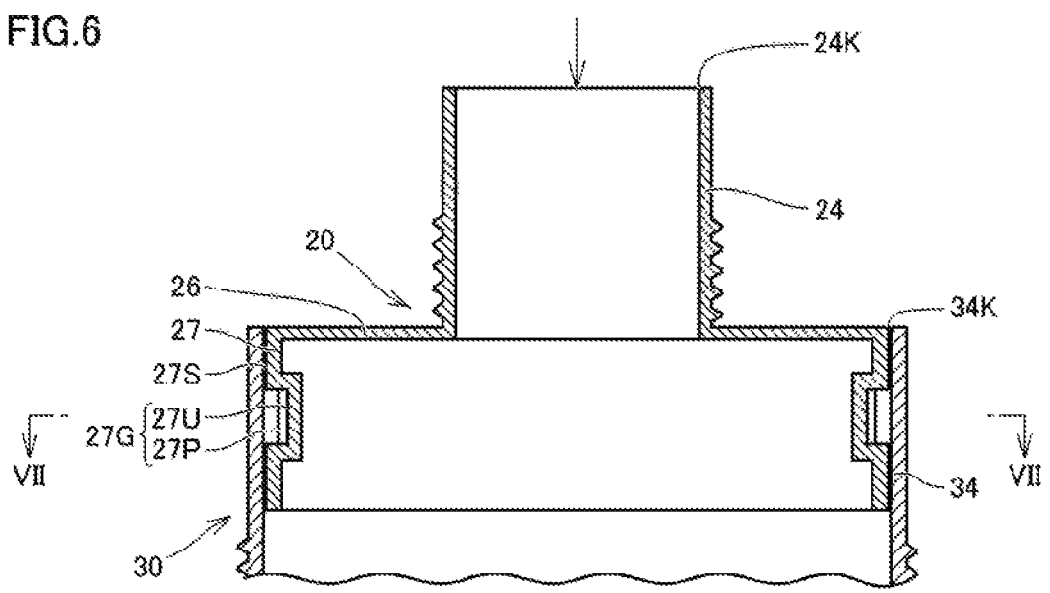
FIG. 6 is a cross-sectional view illustrating a second step (insertion step) of the crimping method of Embodiment 1.
Figure 7:
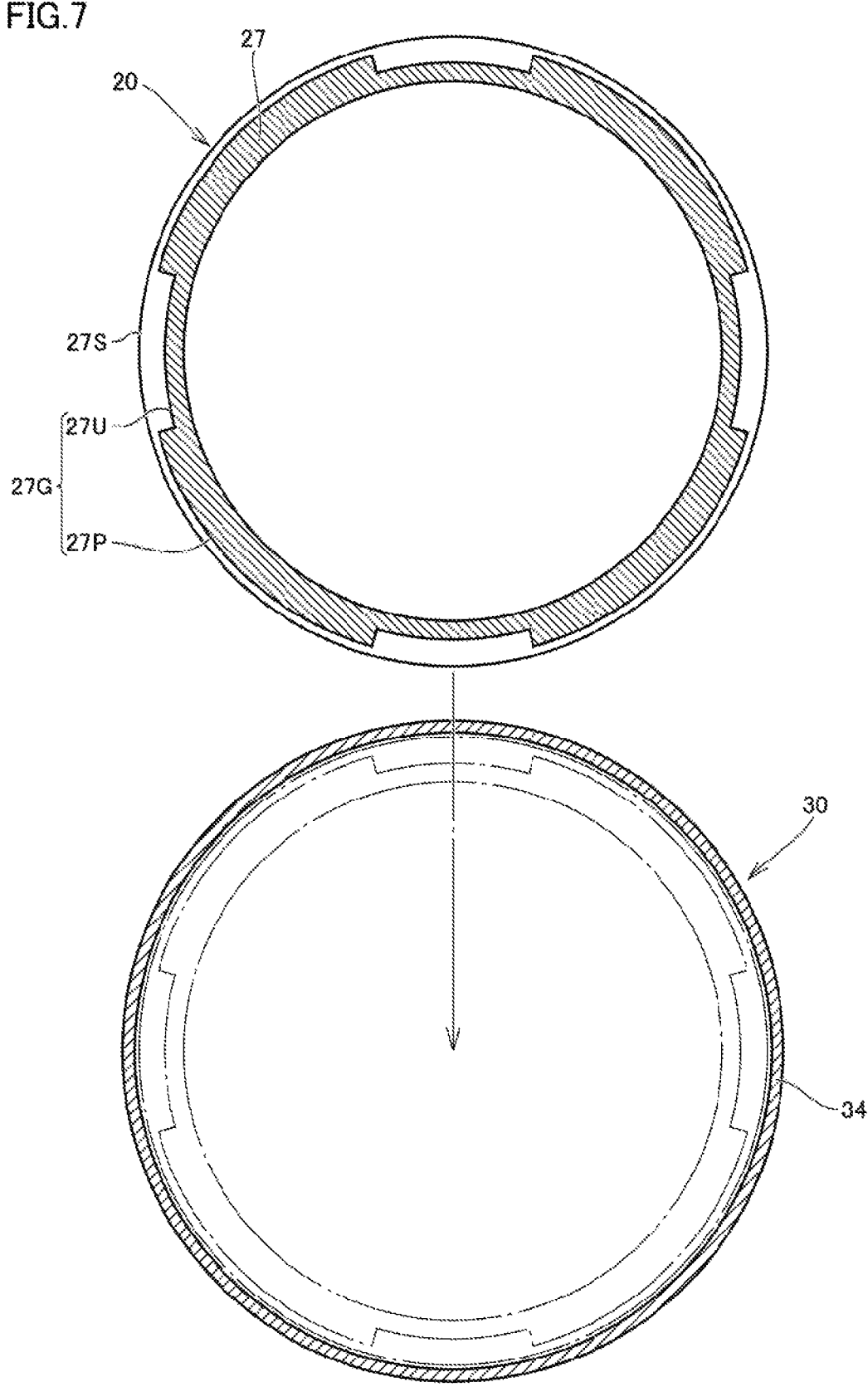
FIG. 7 is a cross-sectional view taken along a line VII-VII of FIG. 6.

FIG. 6 is a cross-sectional view illustrating the state in which the insertion portion 27 of the cover body 20 is inserted into the cylindrical portion 34 of the base fitting 30. FIG. 7 is a cross-sectional view taken along a line VII-VII of FIG. 6. In FIG. 7, the cover body 20 that is inserted into the cylindrical portion 34 is shown by long dash-dotted lines. As shown in FIGS. 6 and 7, the insertion portion 27 of the cover body 20 is inserted into the cylindrical portion 34 of the base fitting 30 via the opening 34K.

Diameter-Reducing Step

Figure 8:
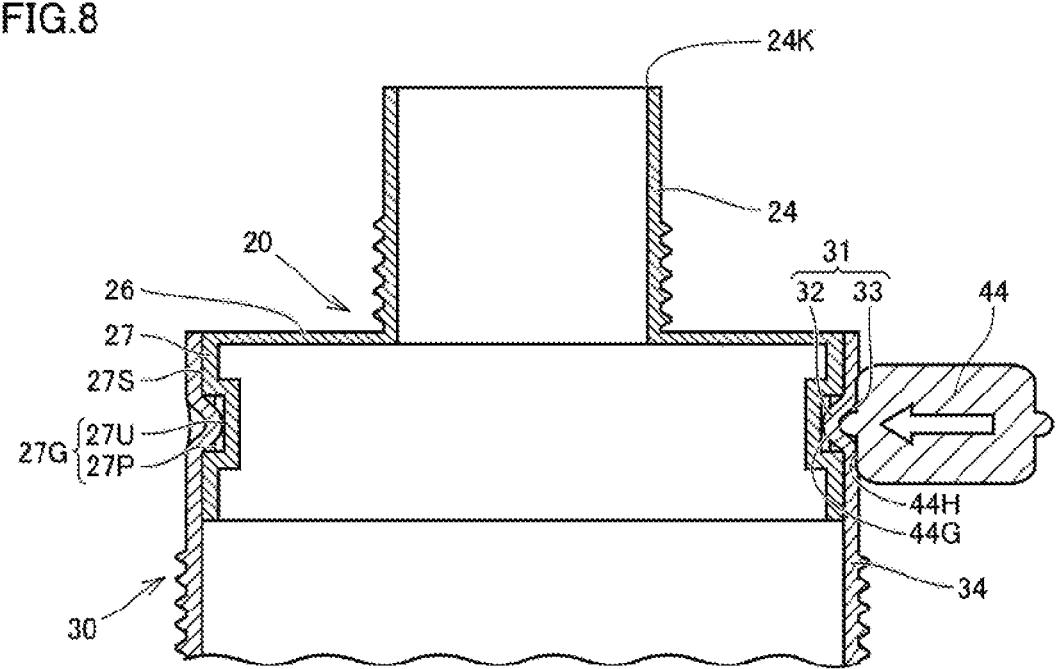
FIG. 8 is a cross-sectional view illustrating a third step (diameter-reducing step) of the crimping method of Embodiment 1.

Referring to FIG. 8, a spinning roller 44 is prepared. The spinning roller 44 has an outer surface 44H, and a crimping portion 44G that projects outward from the outer surface 44H. The crimping portion 44G of the spinning roller 44 is used to subject the cylindrical portion 34 of the base fitting 30 to spinning (crimping). By applying a crimping load from the crimping portion 44G of the spinning roller 44, the diameter of the part of the cylindrical portion 34 that corresponds to the annular groove 27G is reduced. A part of the portion whose diameter is reduced plastically deforms so as to enter the recessed portions 27U, and forms the protruding portions 32. Another part of the portion whose diameter is reduced plastically deforms so as to conform to the shape of the surfaces of the projecting portions 27P, and forms the large-diameter portions 33. The large-diameter portions 33 correspond to the "recessed regions".

Here, the position of an opening edge of the annular groove 27G is set as a reference position. The distance from this reference position to a position of the front end, in an entering direction, of the protruding portion 32 that has entered the annular groove 27G is set as "entry amount of the protruding portion 32". The entry amount of the protruding portion 32 is preferably from a value obtained by "thickness of the cylindrical portion 34 of the base fitting 30×0.3" to a value obtained by "thickness of the cylindrical portion 34 of the base fitting 30×0.9", in view of ensuring the joining strength between the base fitting 30 and the cover body 20 without causing breakage of the cylindrical portion 34 of the base fitting 30. When the spinning is complete, a crimp structure is realized between the cover body 20 and the base fitting 30, and the cover body 20 and the base fitting 30 are joined to each other.

Insertion Step

Figure 9:
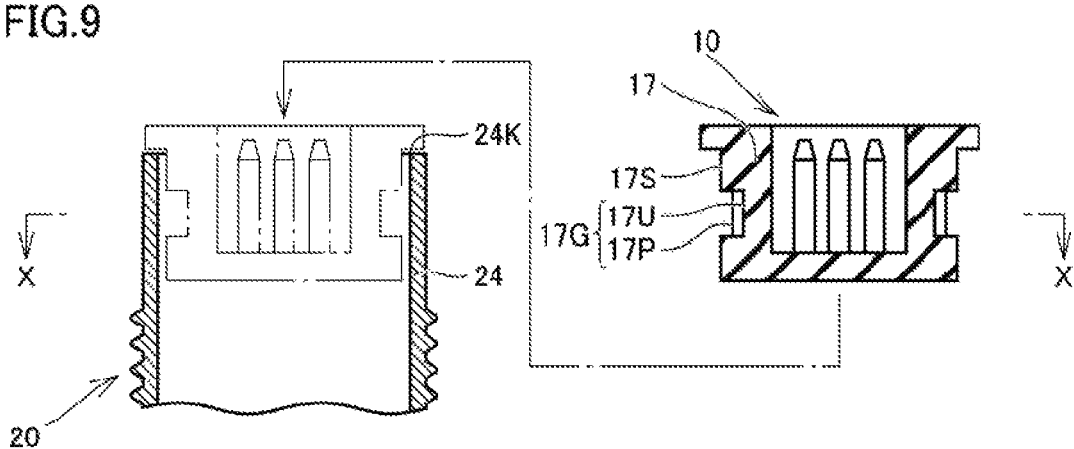
FIG. 9 is a cross-sectional view illustrating a fourth step (insertion step) of the crimping method of Embodiment 1.
Figure 10:
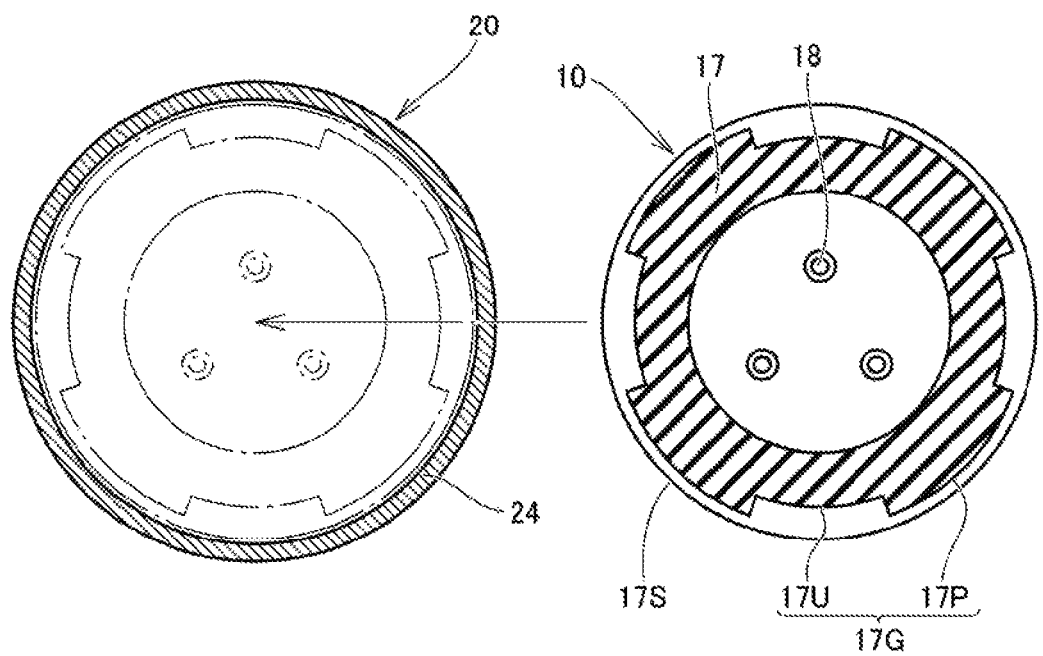
FIG. 10 is a cross-sectional view taken along a line X-X of FIG. 9.

FIG. 9 is a cross-sectional view illustrating the state when inserting the insertion portion 17 of the connector 10 into the cylindrical portion 24 of the cover body 20. FIG. 10 is a cross-sectional view taken along a line X-X of FIG. 9. In FIGS. 9 and 10, the connector 10 that is inserted into the cylindrical portion 24 is shown by long dash-dotted lines. As shown in FIGS. 9 and 10, the insertion portion 17 of the connector 10 is inserted into the cylindrical portion 24 of the cover body 20 via the opening 24K.

Diameter-Reducing Step

Figure 11:
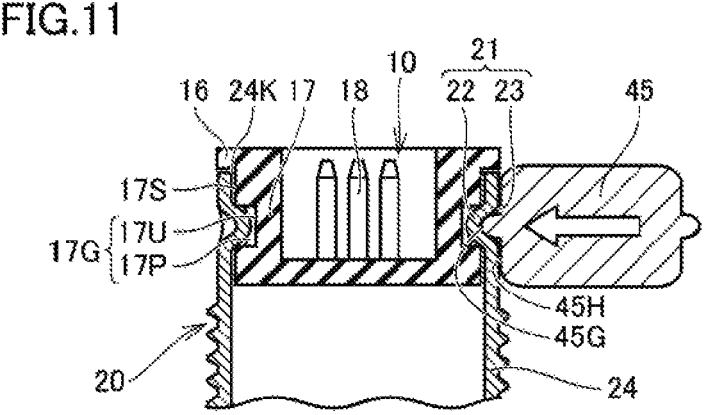
FIG. 11 is a cross-sectional view illustrating a fifth step (diameter-reducing step) of the crimping method of Embodiment 1.

Referring to FIG. 11, a spinning roller 45 is prepared. The spinning roller 45 has an outer surface 45H and a crimping portion 45G that projects outward from the outer surface 45H. The crimping portion 45G of the spinning roller 45 is used to subject the cylindrical portion 24 of the cover body 20 to spinning (crimping). By applying a crimping load from the crimping portion 45G of the spinning roller 45, the diameter of the part of the cylindrical portion 24 that corresponds to the annular groove 17G is reduced. A part of the portion whose diameter is reduced plastically deforms so as to enter the recessed portions 17U, and forms the protruding portions 22. Another part of the portion whose diameter is reduced plastically deforms so as to conform to the shape of the surfaces of the projecting portions 17P, and forms the large-diameter portions 23. The large-diameter portions 23 correspond to "recessed regions".

Here, the position of an opening edge of the annular groove 17G is set as a reference position. The distance from this reference position to a position of the front end, in an entering direction, of the protruding portion 22 that has entered the annular groove 17G is set as "entry amount of the protruding portion 22". The entry amount of the protruding portion 22 is preferably from a value obtained by "thickness of the cylindrical portion 24 of the cover body 20×0.3" to a value obtained by "thickness of the cylindrical portion 24 of the cover body 20×0.9", in view of ensuring the joining strength between the cover body 20 and the connector 10 without causing breakage of the cylindrical portion 24 of the cover body 20. When the spinning is complete, a crimp structure is realized between the connector 10 and the cover body 20, and the connector 10 and the cover body 20 are joined to each other.

Functions and Effects

As described above, in the present embodiment, the annular groove 17G and the reduced-diameter portion 21 have the above-described configuration, and thereby a crimp structure is realized between the connector 10 and the cover body 20, and the connector 10 and the cover body 20 are joined to each other. Positional shifting of the annular groove 17G and the reduced-diameter portion 21 in the circumferential direction is suppressed by the protruding portions 22 and the recessed portions 17U being fitted to each other. That is, relative rotation of the connector 10 and the cover body 20 is suppressed by the protruding portions 22 and the recessed portions 17U being fitted to each other.

Furthermore, in the present embodiment, with the above-described configuration of the annular groove 27G and the reduced-diameter portion 31, a crimp structure is realized between the cover body 20 and the base fitting 30, and the cover body 20 and the base fitting 30 are fitted to each other. Positional shifting of the annular groove 27G and the reduced-diameter portion 31 in the circumferential direction is suppressed by the protruding portions 32 and the recessed portions 27U being fitted to each other. That is, relative rotation of the cover body 20 and the base fitting 30 is suppressed by the protruding portions 32 and the recessed portions 27U being fitted to each other.

The crimp structure disclosed by JP H05-317992A (Patent Document 1) mentioned in the introduction employs a configuration in which a part of an end of the outer member is cut off, and a flake-like part formed by the cutting-off is bent inward and is fitted into a groove provided in the inner member. In this configuration, only a portion of the circumference is used for joining. The configuration disclosed in this publication is understood as having a lower strength in the vertical direction (axial direction) than that of the present embodiment in which joining in the circumferential direction is realized.

Furthermore, since the configuration disclosed in this publication employs a configuration in which a part of the outer member is cut off, it is difficult to subject the cut-off portion to surface processing such as plating. This may be the cause of corrosion, rust, or the like, unless a special countermeasure is performed. In contrast to this, the present embodiment realizes a crimp structure by annularly reducing the diameter toward the annular groove, and thus it is possible to easily perform surface processing such as plating. No angulated part such as the cut-off portion is formed, and thus the present embodiment is to be understood as being superior to the above-described document in view of design.

Embodiment 2

Figure 12:
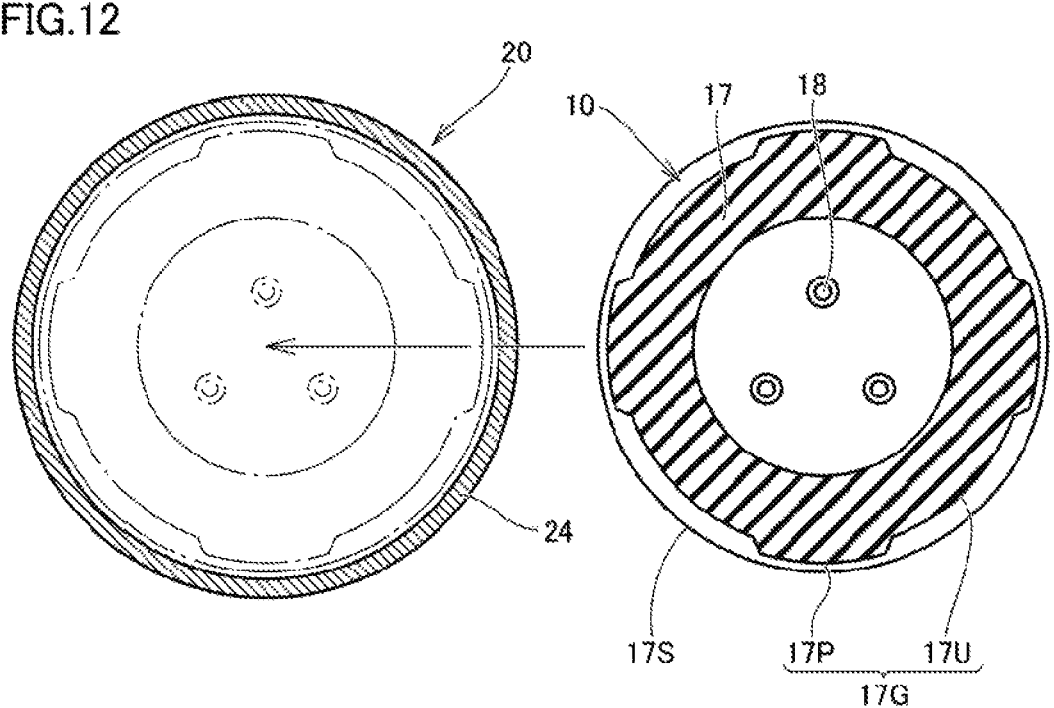
FIG. 12 is a cross-sectional view illustrating an insertion step of a crimping method of Embodiment 2.

Referring to FIG. 12 (and FIG. 10), in the present embodiment, the annular groove 17G formed in the outer circumferential surface 17S of the connector 10 has a different configuration from that of above-described Embodiment 1. In the present embodiment, the positional relationship between the recessed portions 17U and the projecting portions 17P is opposite to that of above-described Embodiment 1. Also in the present embodiment, the projecting portions 17P are each located between adjacent recessed portions 17U, and are located inside the annular groove 17G.

Figure 13:
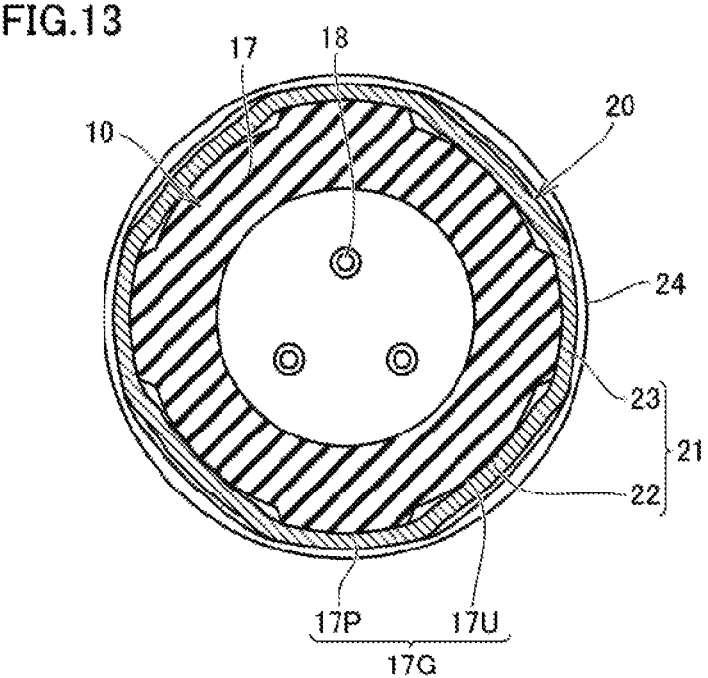
FIG. 13 is a cross-sectional view illustrating a crimp structure of Embodiment 2.

Referring to FIG. 13, by performing spinning, the diameter of the part of the cylindrical portion 24 that corresponds to the annular groove 17G is reduced. A part of the portion whose diameter is reduced plastically deforms so as to enter the recessed portions 17U, and forms the protruding portions 22. Another part of the portion whose diameter is reduced plastically deforms so as to conform to the shape of the surfaces of the projecting portions 17P, and forms the large-diameter portions 23. A crimp structure is realized between the connector 10 and the cover body 20, and the connector 10 and the cover body 20 are fitted to each other. Relative rotation of the connector 10 and the cover body 20 is suppressed by the protruding portion 22 and the recessed portion 17U being fitted to each other. The configuration of the present embodiment is applicable to a crimp structure between the cover body 20 and the base fitting 30, or a crimping method for the same.

Embodiment 3

Figure 14:
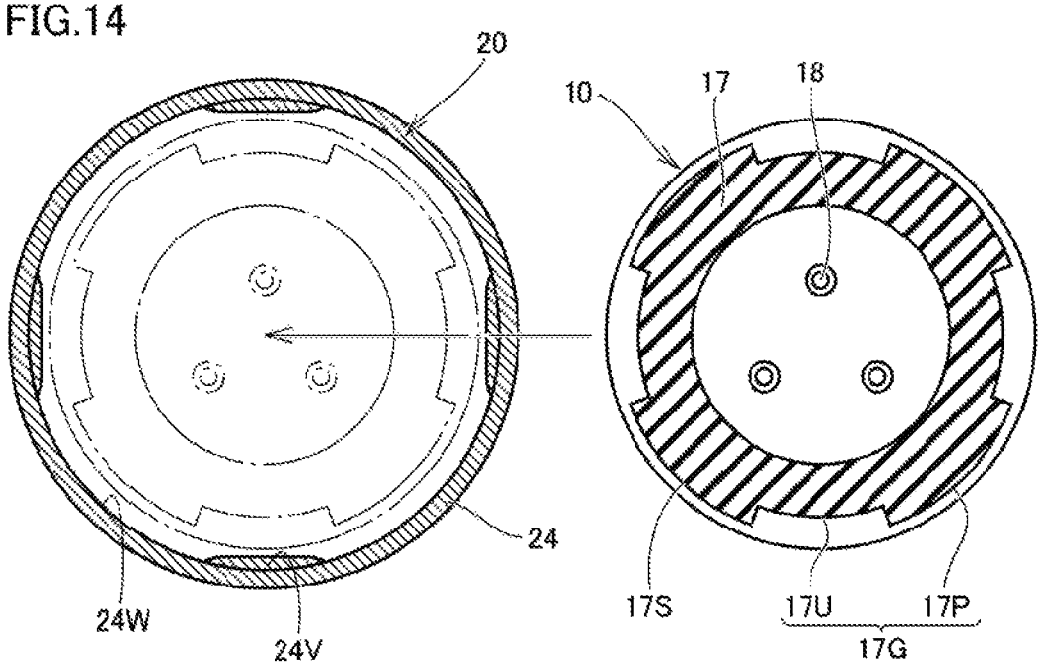
FIG. 14 is a cross-sectional view illustrating an insertion step of a crimping method according to Embodiment 3.

Referring to FIG. 14, in the present embodiment, extended portions 24V that protrude inward in the radial direction are provided inside the cylindrical portion 24. A recessed region 24W is formed between adjacent extended portions 24V. The projection height, in the radial direction, of the extended portions 24V is preferably at least a value that is obtained by "groove depth of the annular groove 17G×0.5", in view of preventing relative rotation of the connector 10 and the cover body 20. Preferably, at least two extended portions 24V are provided in view of preventing rotation and ensuring joining strength in the axial direction. The groove depth, in the radial direction, of the recessed region 24W is preferably at least the projection height of the extended portions 24V.

Figure 15:
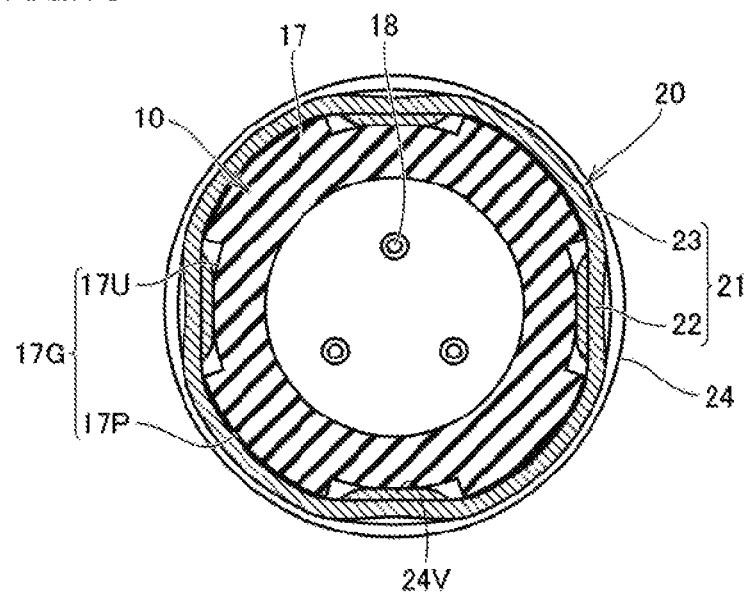
FIG. 15 is a cross-sectional view illustrating a crimp structure of Embodiment 3.

Referring to FIG. 15, by performing spinning, the recessed regions 24W are fitted to the projecting portions 17P formed between adjacent recessed portions 17U of the insertion portion 17 of the connector 10. Also with the above-described configuration, a crimp structure is realized between the connector 10 and the cover body 20, and the connector 10 and the cover body 20 are fitted to each other. Relative rotation of the connector 10 and the cover body 20 is suppressed, by the protruding portions 22 and the extended portions 24V being fitted to the recessed portions 17U. The configuration of the present embodiment is applicable to a crimp structure between the cover body 20 and the base fitting 30, and a crimping method for the same.

Embodiment 4

Figure 16:
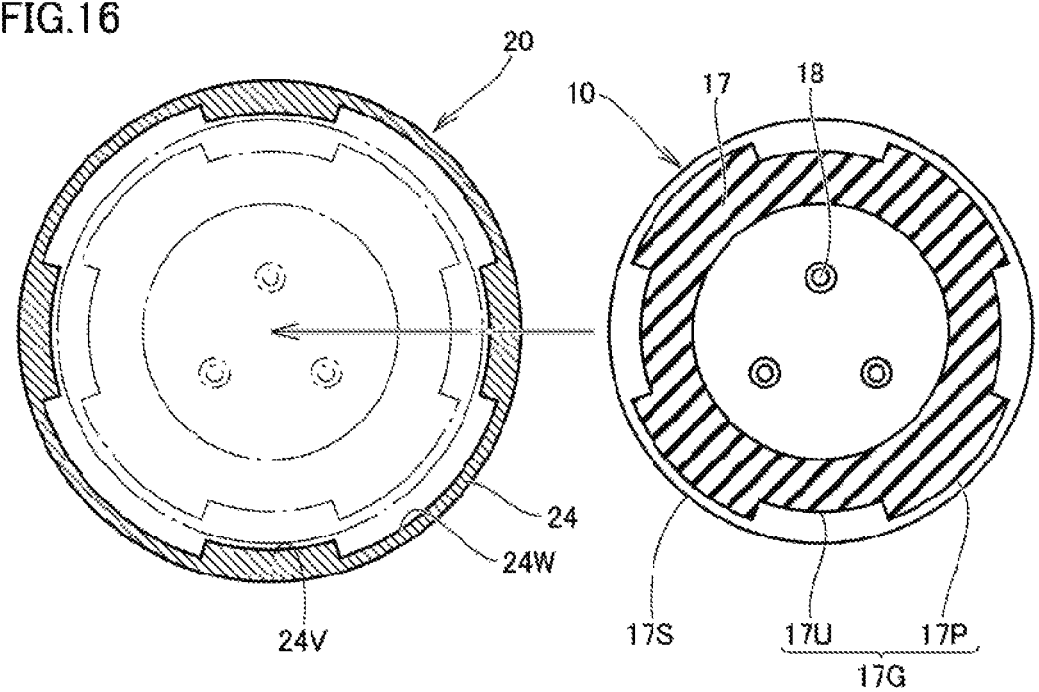
FIG. 16 is a cross-sectional view illustrating an insertion step of a crimping method of Embodiment 4.

Referring to FIG. 16, in the present embodiment, the extended portions 24V and the recessed regions 24W have the shapes that respectively correspond to the recessed portions 17U and the projecting portions 17P. Also with the above-described configuration, a crimp structure is realized between the connector 10 and the cover body 20, and the connector 10 and the cover body 20 are joined to each other. Relative rotation of the connector 10 and the cover body 20 is suppressed by the protruding portions 22 and the extended portions 24V being fitted to the recessed portions 17U.

Also in the present embodiment, the projection height, in the radial direction, of the extended portions 24V is preferably at least a value that is obtained by "groove depth of the annular groove 17G×0.5", in view of preventing relative rotation of the connector 10 and the cover body 20. Preferably, at least two extended portions 24V are provided in view of preventing rotation and ensuring joining strength in the axial direction. The groove depth, in the radial direction, of the recessed regions 24W is preferably at least the projection height of the extended portions 24V. The configuration of the present embodiment is applicable to a crimp structure between the cover body 20 and the base fitting 30, and a crimping method for the same.

Embodiment 5

Figure 17:
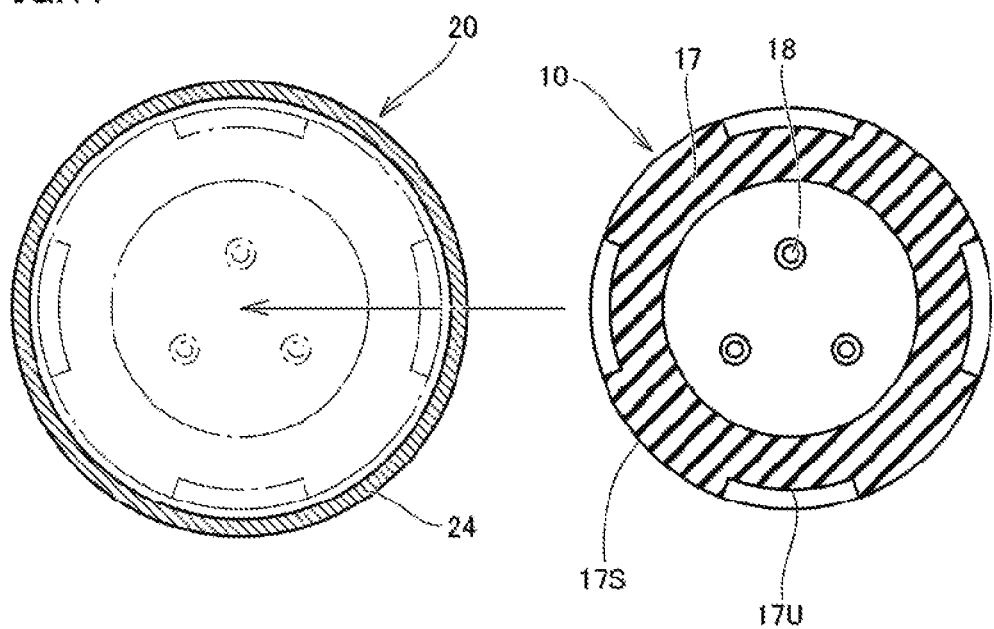
FIG. 17 is a cross-sectional view illustrating an insertion step of a crimping method of Embodiment 5.

Referring to FIG. 17, in the above-described embodiments, the recessed portions 17U and the projecting portions 17P are formed inside the annular groove 17G. On the other hand, in the present embodiment, the outer circumferential surface 17S of the insertion portion 17 of the connector 10 is not provided with an annular groove (see, for example, the annular groove 17G of FIG. 10), and only recessed portions 17U are formed by parts of the outer circumferential surface 17S being recessed inward.

Also in the present embodiment, by performing spinning, a crimp structure is realized between the connector 10 and the cover body 20, and the connector 10 and the cover body 20 are joined to each other. Relative rotation of the connector 10 and the cover body 20 is suppressed by the protruding portions 22 and the recessed portions 17U being fitted to each other. The configuration of the present embodiment is applicable to a crimp structure between the cover body 20 and the base fitting 30, and a crimping method for the same.

Other Embodiments

Foregoing Embodiments 1 to 5 employ a configuration in which an annular groove (such as the annular groove 17G or 27G) has a rectangular cross-sectional shape. The cross-sectional shape of the annular groove may be hemispherical, triangular, or trapezoidal.

In foregoing Embodiments 1 to 5, a thin sheet for improving air tightness, liquid tightness, joining capability, and the like may be arranged in the joined part between the connector 10 and the cover body 20, and in the joined part between the cover body 20 and the base fitting 30. The sheet may have a so-called backlash-absorbing function.

Foregoing Embodiments 1 to 5 employs a configuration in which the projection portions (projection portions 17P and 27P) have a rectangular cross-sectional shape. The cross-sectional shape of the projection portions may be hemispherical, triangular, or trapezoidal. A combination of the shapes of the projection portions and the recessed regions (the large-diameter portions 23, 33 and the recessed regions 24W) may be a combination of the same shapes, or a combination of different shapes.

In foregoing Embodiments 1 to 5, the reduced-diameter portions 21 and 31 are formed on the midway part in the axial direction of the cylindrical portions 24 and 34. The present invention is not limited to this configuration, and the reduced-diameter portions 21 and 31 may be formed at the ends of the cylindrical portions 24 and 34 on which the openings 24K and 34K are formed.

The foregoing embodiments have been described taking a nearby sensor as an example of an electronic device, but the present invention is not limited to a nearby sensor. The idea disclosed in the foregoing embodiments may be applied to a photoelectric sensor, a fiber sensor, a smart sensor, a rotary encoder, a servomotor, and the like. In such a case, metal members that constitute a device such as a photoelectric sensor may be joined to each other, or a metal member and a resin member that constitute a device such as a photoelectric sensor may be joined to each other. The idea disclosed in the foregoing embodiments is also effectively applicable to a case where a metal cover and a metal case are joined to a cable.

EXAMPLES

The following will describe examples that were conducted with respect to foregoing Embodiment 1 with reference to FIGS. 18 to 23. The examples include Examples A1 to A6 (FIG. 18), Examples B1 to B5 (FIG. 19), Examples C1 to C5 (FIG. 20), Examples D1 to D5 (FIG. 21), Examples E1 to E4 (FIG. 22), and Examples F1 to F5 (FIG. 23). These examples have various different setting conditions (details thereof will be described later).

After the cover body 20 (cylindrical portion 24) was joined to the connector 10 (insertion portion 17), a tensile test was conducted on the joined cover body 20 and connector 10, in order to evaluate the joining strength in an axial direction. Furthermore, a torque test was conducted on the joined cover body 20 and connector 10, in order to evaluate the joining strength in the rotation direction. Comprehensively taking into consideration the joining strength in the axial and rotational directions, the test results are evaluated in five levels of A to E, the joining strengths A to E being set as evaluation references. When the joining strength is at a predetermined value or more, the evaluation is given as "A" (highest evaluation), followed by evaluations "B" to "E" in descending order.

As a condition shared by the examples, the crimping machine "US-70N" made by YOSHIKAWA IRON WORKS was used. The tensile test machine "AG-10kNX" made by SHIMADZU Corporation was used. The torque meter "WP4-200BN" made by ECLATORQ was used. The outer diameter of the insertion portion 17 of the connector 10 (diameter of the outer circumferential surface 17S) is 26.6 mm. The material of the cover body 20 is brass, and the diameter of the inner circumferential surface of the cylindrical portion 24 is 26.9 mm.

Examples A1 to A6

Referring to FIG. 18, in Examples A1 to A6, the thickness of the cylindrical portion 24 of the cover body 20 is different between Examples A1 to A6, and the width of the annular groove 17G provided in the connector 10 is different between Examples A1 to A6, as shown in FIG. 18. On the other hand, the depth of the annular groove 17G (recessed portions 17U) provided in the connector 10 is uniformly 0.25 mm, and also the front end R of the crimping portion 45G of the spinning roller 45 (FIG. 11) for use in forming the protruding portions 22 is uniformly 0.30 mm.

The method described with reference to Embodiment 1 above was used to join the cylindrical portion 24 of the cover body 20 to the connector 10, and then a tensile test and a torque test were conducted. As a result, evaluation results as shown in FIG. 18 were obtained. Among Examples A1 to A6, excellent results were obtained in Examples A3 and A4.

Examples B1 to B5

Referring to FIG. 19, in Examples B1 to B5, the width of the annular groove 17G relative to the thickness of the cover body 20 (cylindrical portion 24) is different between Examples B1 to B5, as shown in FIG. 19. On the other hand, the thickness of the cylindrical portion 24 of the cover body 20 is uniformly 0.40 mm, the depth of the annular groove 17G (recessed portions 17U) is uniformly 0.25 mm, and also a front end R of the crimping portion 45G of the spinning roller 45 (FIG. 11) for use in forming the protruding portions 22 is uniformly 0.30 mm.

The method described with reference to Embodiment 1 above was used to join the cylindrical portion 24 of the cover body 20 to the connector 10, and then a tensile test and a torque test were conducted. As a result, evaluation results as shown in FIG. 19 were obtained. Among Examples B1 to B5, excellent results were obtained in Examples B4 and B5.

Examples C1 to C5

Referring to FIG. 20, in Examples C1 to C5, the depth of the annular groove 17G (recessed portions 17U) is different between Examples C1 to C5, as shown in FIG. 20. On the other hand, the thickness of the cylindrical portion 24 of the cover body 20 is uniformly 0.40 mm, the width of the annular groove 17G (recessed portions 17U) is uniformly 1.00 mm, and also the front end R of the crimping portion 45G of the spinning roller 45 (FIG. 11) for use in forming the protruding portions 22 is uniformly 0.30 mm.

The method described with reference to Embodiment 1 above was used to join the cylindrical portion 24 of the cover body 20 to the connector 10, and then a tensile test and a torque test were conducted. As a result, evaluation results as shown in FIG. 20 were obtained. Among Examples C1 to C5, excellent results were obtained in Examples C4 and C5.

Examples D1 to D5

Referring to FIG. 21, in Examples D1 to D5, the entry amount of the protruding portions 22 is different between Examples D1 to D5, as shown in FIG. 21. On the other hand, the thickness of the cylindrical portion 24 of the cover body 20 is uniformly 0.40 mm, the width of the annular groove 17G is uniformly 1.00 mm, the depth of the annular groove 17G (recessed portions 17U) is uniformly 0.25 mm, and also the front end R of the crimping portion 45G of the spinning roller 45 (FIG. 11) for use in forming the protruding portions 22 is uniformly 0.30 mm. Furthermore, the amount of reduction in diameter of the cover body 20 (cylindrical portion 24) is uniformly 1.5%. "Amount of reduction in diameter of the cover body 20 (cylindrical portion 24)" refers to a ratio showing how much the inner diameter is reduced at a point in time at which the protruding portion 22 is formed from an initial state (state shown in FIG. 5) in which none of the reduced-diameter portion 21, the protruding portion 22, and the large-diameter portion 23 is formed on the cylindrical portion 24.

The method described with reference to Embodiment 1 above was used to join the cylindrical portion 24 of the cover body 20 to the connector 10, and then a tensile test and a torque test were conducted. As a result, evaluation results as shown in FIG. 21 were obtained. Among Examples D1 to D5, excellent results were obtained in Examples D3 and D4.

Examples E1 to E4

Referring to FIG. 22, in Examples E1 to E4, the height of the projection portions 17P provided on the insertion portion 17 of the connector 10 is different between Examples E1 to E4, as shown in FIG. 22. On the other hand, the thickness of the cylindrical portion 24 of the cover body 20 is uniformly 0.40 mm, the width of the annular groove 17G is uniformly 1.00 mm, the depth of the annular groove 17G (recessed portions 17U) is uniformly 0.20 mm, the width of the projecting portions 17P is uniformly 1.00 mm, and the number of the projecting portions 17P is uniformly 6, and also the front end R of the crimping portion 45G of the spinning roller 45 (FIG. 11) for use in forming the protruding portions 22 is uniformly 0.30 mm.

The method described with reference to Embodiment 1 above was used to join the cylindrical portion 24 of the cover body 20 to the connector 10, and then a tensile test and a torque test were conducted. As a result, evaluation results as shown in FIG. 22 were obtained. Among Examples E1 to E4, excellent results were obtained in Examples E2 and E2.

Examples F1 to F5

Referring to FIG. 23, in Examples F1 to F5, the number of projecting portions 17P that are provided on the insertion portion 17 of the connector 10 is different between Examples F1 to F5, as shown in FIG. 22. On the other hand, the thickness of the cylindrical portion 24 of the cover body 20 is uniformly 0.40 mm, the width of the annular groove 17G is uniformly 1.00 mm, the depth of the annular groove 17G (recessed portions 17U) is uniformly 0.20 mm, the height of the projecting portions 17P is uniformly 0.15 mm, the width of the projecting portions 17P is uniformly 1.00 mm, and also the front end R of the crimping portion 45G of the spinning roller 45 (FIG. 11) for use in forming the protruding portions 22 is uniformly 0.30 mm.

The method described with reference to Embodiment 1 above was used to join the cylindrical portion 24 of the cover body 20 to the connector 10, and then a tensile test and a torque test were conducted. As a result, evaluation results as shown in FIG. 23 were obtained. Among Examples F1 to F5, excellent results were obtained in Examples F3 and F4.

In Examples A1 to A6 (FIG. 18), Examples B1 to B5 (FIG. 19), Examples C1 to C5 (FIG. 20), Examples D1 to D5 (FIG. 21), Examples E1 to E4 (FIG. 22), and Examples F1 to F5 (FIG. 23), no result was obtained that shows Evaluation E (the lowest evaluation among A to E) in which the joining strength in the axial direction and the rotating direction are predetermined values or less. Accordingly, it is clear that, by employing the above-described configuration of Embodiment 1, it is possible to realize a joined structure that ensures high joining strength in the axial direction and the rotating direction.

The embodiments and the examples of the present invention have been described so far, but the content of that disclosed above is exemplary in all respects and not restrictive. The technical scope of the present invention is defined by the claims, and is intended to encompass all modifications in the sense and the scope equivalent to the claims.

INDEX TO THE REFERENCE NUMERALS

10 . . . Connector, 16 . . . Flange, 17, 27 . . . Insertion portion, 17G, 27G . . . Annular groove, 17P, 27P . . . Projecting portion, 17S, 27S . . . Outer circumferential surface, 17U, 27U . . . Recessed portion, 18 . . . Terminal pin, 20 . . . Cover body, 21, 31 . . . Reduced-diameter portion, 22, 32 . . . Protruding portion, 23, 33 . . . Large-diameter portion, 24K, 34K . . . Opening, 24, 34 . . . Cylindrical portion, 24V . . . Extended portion, 24W . . . Recessed region, 26 . . . Disk portion, 30 . . . Base fitting, 38 . . . Front face, 44, 45 . . . Spinning roller, 44G, 45G . . . Crimping portion, 44H, 45H . . . Outer surface, 100 . . . Electronic device

The invention claimed is:

1. A crimp structure in which an inner member and an outer member that is arranged outside the inner member are joined to each other, wherein:
the inner member comprises:
an insertion portion comprising a columnar surface-like outer circumferential surface;
an annular groove provided on the outer circumferential surface; and
a recessed portion that is provided in the outer circumferential surfacel;
the outer member comprises:
a cylindrical portion that forms an opening into which the insertion portion is inserted;
a reduced-diameter portion that is formed on the cylindrical portion, and comprises a plastically deformed shape such that a diameter of the cylindrical portion is reduced annularly inward in a radial direction; and
a protruding portion comprising a plastically deformed shape such that a part, in a circumferential direction, of the reduced-diameter portion enters the recessed portion.

2. The crimp structure according to claim 1, wherein:
the inner member comprises a plurality of the recessed portions; and
the outer member comprises a plurality of the protruding portions.

3. The crimp structure according to claim 2,
wherein the plurality of recessed portions are lined up at equal intervals in the circumferential direction.

4. The crimp structure according to claim 2,
wherein the plurality of recessed portions have the same shape.

5. The crimp structure according to claim 2,
wherein the outer member comprises a recessed region that is fitted to a projecting portion formed between adjacent recessed portions of the inner member.

6. The crimp structure according to claim 1,
wherein
the recessed portion is formed inside the annular groove.

7. An electronic device comprising the crimp structure according to claim 1.

8. A crimping method of performing crimping to join an outer member to an inner member that is arranged inside the outer member, the method comprising:
preparing the inner member, the inner member comprising an insertion portion comprising a columnar surface-like outer circumferential surface, an annular groove provided on the outer circumferential surface, and a recessed portion provided in the outer circumferential surface;
preparing the outer member, the outer member comprising a cylindrical portion that forms an opening into which the insertion portion is to be inserted;
inserting the insertion portion into the cylindrical portion; and
reducing a diameter of the cylindrical portion with spinning,
wherein, by reducing the diameter of the cylindrical portion, a reduced-diameter portion comprising a plastically deformed shape such that a diameter of a part of the cylindrical portion is reduced annularly inward in a radial direction, and a protruding portion comprising a plastically deformed shape such that a part, in a circumferential direction, of the reduced-diameter portion has entered the recessed portion are formed in the outer member.

9. The crimping method according to claim 8, wherein:
the inner member comprises a plurality of the recessed portions; and
the outer member comprises a recessed region that is fitted to a projecting portion formed between adjacent recessed portions.

10. The crimping method according to claim 8, wherein:
the inner member comprises a plurality of the recessed portions; and
by reducing a diameter of the cylindrical portion, a recessed region that is fitted to a projecting portion formed between adjacent recessed portions is formed in the cylindrical portion of the outer member.

11. The crimping method according to claim 8, wherein:
the recessed portion is formed inside the annular groove.

* * * * *